Figure 1:
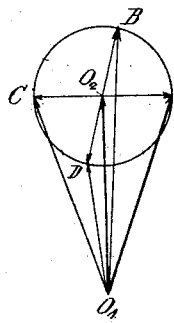

April 12, 1927.　　　A. YTTERBERG　　　1,624,457

METHOD AND MEANS FOR TESTING ELECTRIC MACHINERY

Filed Feb. 18, 1921

Inventor:
A. Ytterberg
by F. Dittmar
Attorney

Patented Apr. 12, 1927.

1,624,457

UNITED STATES PATENT OFFICE.

ARLE YTTERBERG, OF VASTERAS, SWEDEN, ASSIGNOR TO ALLMÄNNA SVENSKA ELEKTRISKA AKTIEBOLAGET, OF VASTERAS, SWEDEN, A CORPORATION OF SWEDEN.

METHOD AND MEANS FOR TESTING ELECTRIC MACHINERY.

Application filed February 18, 1921, Serial No. 446,076, and in Sweden December 11, 1920.

An important feature in the manufacture of dynamo-electrical machinery is the testing thereof. In view of the great number of incidental circumstances which may interfere with the result of even the most careful calculation and design, no electric machine should be considered ready for delivery until it has been subjected to at any rate certain tests after mounting. The most important test to which it is desirable that all machines should be subjected, is the full load, or heat, test in which the machine is run at full load for a time sufficient with regard to the intended operating conditions of the machine, for obtaining the highest temperature likely to occur in normal working. This test serves principally to check the properties of the machine as regards heating, but may also serve as a control of its load characteristics in general.

The complete heat test, however, according to hitherto known methods, necessitates the use of a machine of about the same magnitude as the machine under test, and adapted to be mechanically coupled thereto either for driving it, or for being driven by it. Especially when testing large machines such an auxiliary machine is seldom available and even if it were, the mechanical coupling may meet with insurmountable difficulties, for instance in vertical machinery. In such cases, it has therefore only been practicable to arrange partial load tests; for instance, a no-load test at an excitation a little above normal combined with a short-circuit test, but this combination occupies a considerable time and only under certain conditions will it give an exact idea of the properties at full load.

The present invention provides a method by which dynamo-electrical machines of practically any size can be subjected to an accurate and perfectly reliable load-test without any mechanical connection to another machine. According to the said method the machine is operated alternately as a motor and as a generator in sufficiently rapid succession to make it possible to store as kinetic energy the electrical energy which corresponds to a medium current load of the proper size. When running as a motor without external load the machine has a tendency to accelerate and its kinetic energy to increase. Before the speed has passed over a certain limit in this way the impressed voltage is altered with respect to magnitude, frequency, or phase, in such manner that the machine begins to run as a generator and to diminish its speed whereupon the voltage is again altered and so on. The conditions in the machine vary of course according to its character; for instance, whether it be a synchronous, or an asynchronous alternating current machine or a direct current machine, but the method is the same in principle in all cases.

The periodical alteration of the impressed voltage can be accomplished in various ways. One of these ways is regulation in the field of the driving machine, another is to connect in series with same an auxiliary machine, the voltage of which can be directed alternately in opposite directions. A simple way of applying the last mentioned principle which has proved particularly useful in practice is to run the auxiliary machine, at such speed that its frequency differs slightly from that of the main machine (or from zero if the main machine be for direct current). If the machine under test be, for instance, a fifty cycle alternating current machine, then the main driving machine should be a fifty cycle machine and the auxiliary, smaller machine should be run at, say, fifty-five cycles. The voltage of the former machine should be about equal to the no-load voltage of the machine under test while the voltage of the auxiliary machine should be of the same order of magnitude at the normal voltage drop from no-load to full load of the machine under test, if the latter be of the synchronous type. Under such conditions the machine under test will change its action from generator to motor action five times per second and an equal number of times back again. The frequency of the auxiliary machine should preferably be greater than that of the main driving machine in alternating current systems. If the machine under test be a direct current machine the main driving machine should deliver direct current and the auxiliary machine a low frequency alternating current, for instance, one of five cycles, when the result will be analogous for the machine under test.

If the machine under test be of the asynchronous type the frequency of the impressed voltage should vary an amount in certain relation to the normal slip of the machine, the numerical value of the voltage being of less importance. The desired fluctuations in the frequency may for instance, be obtained by driving the primary machine by means of a direct current motor, the excitation of which is periodically altered while the voltage is kept constant. The method just described for synchronous machines using two series-connected machines of somewhat different frequencies may, however, also be employed for asynchronous machines, although its manner of operation will then be somewhat different.

If the machine has, for instance, fifty cycles, and the auxiliary machine fifty-six cycles and a voltage amounting to about one-third of that of the main machine, the resulting voltage can be regarded as oscillating between fifty-two and forty-eight cycles. Its magnitude varies in the same time rather considerably, but this variation is equalized to a considerable degree by the voltage drop in machines and leads and is moreover of minor importance in asynchronous machines. The result will be that the asynchronous machine will run alternating with positive and negative slip, that is as a motor and as a generator.

The frequency of these load fluctuations on the machine under test, that is the difference between the frequencies of the two driving machines connected in series, depends to a certain extent on the size of the machine under test and the weight of its rotating masses, but may otherwise be varied within rather wide limits for one machine, for instance from one to ten per second. In choosing the frequency, attention should also be paid to the possibility of obtaining a sharp reading on the instruments, the hands of which generally oscillate at twice the aforesaid frequency. If it be too low, the reading will be difficult, but at few cycles per second it will present practically no difficulty. On the other hand, the frequency should not be too high so as to cause appreciable additional losses by reason of hysteresis, eddy currents, and the like in the machine under test. As an appropriate medium value for medium sized machines the aforesaid example of five per second may serve.

Figure 2:
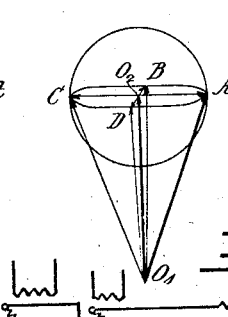
Figure 4:
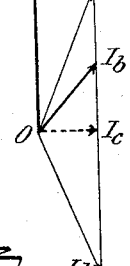
Figure 3:
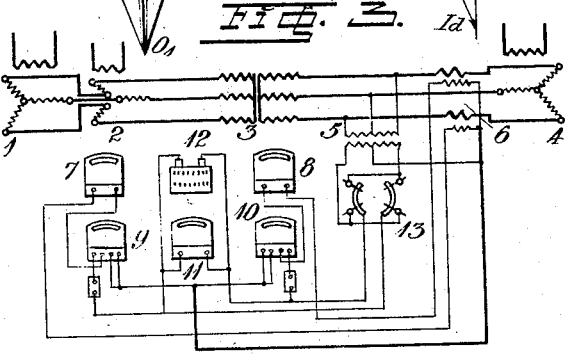
Figure 5:
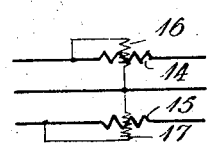
Figure 6:
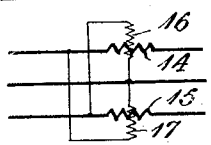
Figure 7:
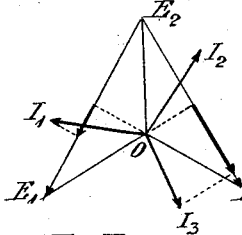
Figure 8:
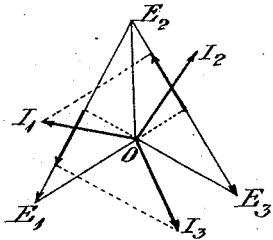
Figure 9:
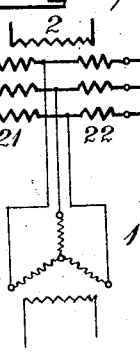
Figure 10:
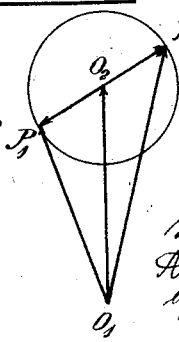

In the accompanying drawing, Figures 1 and 2 are vector-diagrams illustrating the inter-relations of the voltages at a connection of the last-mentioned description for alternating current. Figure 3 is an example of the diagram of connections including those of the measuring instruments. Figure 4 is a current vector-diagram for the machine under test. Figures 5 and 6 are simplified diagrams of connections for measuring the active and reactive power and Figures 7 and 8 are corresponding vector diagrams. Figure 9 is a diagram of connections for simultaneously testing two machines of about the same size and Figure 10 is a corresponding voltage vector-diagram.

In Figure 1, $O$, $O_2$, is the voltage vector of the main driving machine which can be regarded as stationary whilst the time vector rotates with a speed corresponding to the frequency. The voltage of the auxiliary machine is then represented by a vector which rotates oppositely to the time vector around the point $O_2$ with a speed corresponding to the difference between the frequencies of the auxiliary and main machinery. If these be fifty-five and fifty, the last mentioned vector will thus, during one-fifth of a second, successively occupy the position $O_2$ A, $O_2$ B, $O_2$ C, and $O_2$ D. The resulting vector voltage impressed on the machine under test would therefore (supposing there be no voltage drops in the machines, or connections) be successively represented by the vectors $O_1$ A, $O_1$, B, $O_1$ C, and $O_1$ D in Figure 1. By reason of the voltage drops, the voltage will, however, in reality be represented by the vectors designated in the same manner in Figure 2. The said impressed voltage will thus be approximately constant in size while its phase and circular frequency will vary. The variation in the former will be of particular influence for synchronous machines and the variation in the latter for asynchronous machines under test, as already described.

In the diagram of Figure 3 showing a connection for testing according to this method, 1 is the main generator and 2 the auxiliary generator. 3 is a transformer inserted between the said machines and the machine 4 under test, such a transformer being often necessary for obtaining an appropriate medium value of the impressed voltage. The voltage transformers 5 and current transformers 6, are for connecting up the instruments which preferably comprise two ammeters 7 and 8, two wattmeters 9 and 10, a voltmeter 11, and a frequency meter 12. Between the two last-mentioned instruments and the voltage coils of the wattmeters on the one hand, and the voltage transformers on the other hand, is a voltmeter switch 13, the purpose of which shall now be indicated.

As already mentioned, the machine under test oscillates between motor and generator action. As its excitation remains approximately constant all the time (whether it be produced in the machine itself, as is preferably the case in a synchronous machine, or be taken from outside, as in an asynchronous machine) the current diagram will have approximately the aspect shown in Figure 4 where O E indicates the electro-motive-force of the machine and O $I_c$ indicates the current component in quadrature therewith which is approximately constant. The current vector oscillates with its end along a line parallel to the electro-motive-force vector between the two limit positions O $I_a$ and O $I_d$. Its numerical effective medium value is represented by O $I_b$.

For running the machine at full load with respect to heating conditions, O $I_b$ should obviously be equal to its normal current. As O $I_b$ is the mean value which is read on the ammeters, it presents no difficulty at all to adjust it to its proper value. It is, however, also of importance to know the wattless component of the machine current for checking the excitation properties of the machine, and for this purpose the voltmeter switch 13 is provided.

The operation is best illustrated by Figures 5 to 8. Figure 5 shows a simplfied diagram of the connections of the two wattmeters in the position of the switch 13 shown in full lines in Figure 3. 14 and 15 are the current coils and 16 and 17 are the voltage coils of the wattmeters. Voltages and currents are shown in the diagram Figure 7. The phase voltages of the line are O $E_1$, O $E_2$, O $E_3$, the currents O $I_1$, O $I_2$, O $I_3$. The resultant voltages $E_1-E_2$ and $E_2-E_3$, act on the coils 16 and 17, while the currents O $I_1$ and O $I_3$ pass through the coils 14 and 15. The reading of one wattmeter will be proportional to the projection of O $I_1$ on $E_1-E_2$, that of the other proportional to the projection of O $I_3$ on $E_2-E_3$. The sum of both readings can easily be shown to be equal to the total active power. that is, in the present case the power required for covering the machine losses. This is the usual two wattmeter method which has been described here only for comparison with the method illustrated in Figures 6 and 8. In Figure 6 the connections are substantially the same as in Figure 5 except that the outer voltage connections are crossed. The wattmeter readings will therefore be proportional to the projection of O $I_1$, on $E_2-E_3$, and to the projection of O $I_3$ on $E_1-E_2$. Since $E_2-E_3$ is perpendicular to O $E_1$ and $E_1-E_2$ perpendicular to O $E_3$ the aforesaid projections will obviously be proportional to the wattless currents in the respective phases. The total reactive power can therefore easily be found, as it is proportional (if the load be symmetrical) to the sum of the wattmeter readings, multiplied by $$\sqrt{\frac{3}{-2}}.$$

By the connections described it is therefore possible to measure first the mean value of the current load which is determining for the heating of the machine, further the consumed, or produced reactive power at a certain excitation, and finally the total losses under these conditions. All the chief characteristics of the machine will thus be known.

It is particularly to be noted that in an asynchronous machine, where the curve along which the current vector moves, generally differs more from the straight line than in synchronous machines (both curves are more properly circular arcs, and that of the asynchronous machines generally with the smaller radius) the reactive power value which is read on the wattmeters in reality is a mean value between the values prevailing during a complete load-cycle. In practice this mean value will be found to be almost exactly equal to the reactive power at normal load and therefore the normal power factor of the machine is easily measured in this way.

The wattmeter connection just described can of course be modified in such manner that the current coils are shifted instead of the voltage coils, although this will generally be a little more cumbersome by reason of the higher current value in the shifted connections. Of course, if such reconnections be made, care should be taken as usual not to break the secondaries of the current transformers, whence the switch should be of the non-interrupting type.

For measuring the reactive power only, it is not necessary to use both wattmeters which, as already stated, give the same reading if the load be symmetrical, which is most commonly the case, the essential feature being only that the wattmeter employed shall have its current coil in one of the conductors leading to the machine and its voltage coil between the other two conductors.

When two machines of the same, or approximately the same, size can be tested simultaneously a connection according to Figure 9, may be employed. 1 here indicates the main driving machine, and 2 the auxiliary machine, as before, while 41 and 42 are the machines under test. The winding of the auxiliary machine 2, is divided into two equal series connected portions 21 and 22 and the terminals of the machine 1 connected between the said portions. The corresponding vector diagram is shown in Figure 10; $O_1-O_2$ is here the voltage of the main driving machine, $O_2$ $P_1$ and $O_2$ $P_2$ those of the two portions of the auxiliary machine. The result of this connection will be that when the machine 41 receives the reduced (lagging, or low-frequency) impressed voltage and thus acts as a generator, the machine 42 will simultaneously receive an increased, leading or high frequency voltage and act as a motor. The load current will oscillate between the machines 41 and 42 and leave the machine 1 practically unaffected, so that the latter machine can in this case be of considerably smaller current capacity than is required, if the connection according to Figure 3 be employed.

The starting of the test, whether one, or two, machines be tested, is generally made in such a way that the auxiliary machine, which has been running in synchronism with the main driving machine (stationary in direct current system) during the starting up of the machines, is first forced up into a higher speed and then gradually excited while care is taken that its speed is kept approximately constant.

Besides the advantage of making load tests possible for the machines where they have hitherto been impossible of performance, the present invention affords the advantage of considerably simplifying the testing of such machines where a test according to known method would be possible. Such a test would necessitate as already stated, the mechanical connection of the machine under test with another machine of about the same size. This connection must generally be made by direct coupling at least for large machines, as pulleys and belts of sufficient dimensions are generally not available. The connection therefore necessitates a time-wasting lining-up of the machines, and sufficient space must also be provided for placing them in their relative positions. The present invention, therefore, even in cases where it does not represent the only way of performing a load-test, effects great saving of time and economy in space and cost, so that it affords considerable technical advantage in all cases.

Having now described the nature of my said invention and the manner of its operation, I declare that what I claim is:—

1. Method of testing dynamo-electric machinery consisting in running the machine to be tested alternately as a motor and as a generator in sufficiently rapid succession to store as kinetic energy and deliver therefrom the electric energy corresponding to a mean load current equal to that characteristic to the machine, the periodicity of said alternating load being, however, but a small fraction of the normal frequency in the iron core of the machine.

2. Method of testing dynamo-electric machinery consisting in impressing thereupon a voltage composed of two voltage components the frequencies of which differ from each other by a low number per second.

3. Method of testing dynamo-electric machinery consisting in impressing thereupon a voltage composed of two voltage components one of which has the same frequency as the machine under test and is about equal to its no-load voltage, while the other, the frequency of which is higher by a few cycles per second, approximately equals the voltage drop in the machine under test.

4. A means for testing dynamo-electric machinery, comprising current generating means electrically connected to the machine under test and means for periodically varying the voltage of said generating means with respect to phase, frequency or size.

5. A means for testing dynamo-electric machinery comprising two electric machines connected in series to the machine under test, one of said first-named machines being driven at the same frequency as the machine under test and the other machine at a higher frequency.

6. A means for testing dynamo-electric machinery comprising two electric machines connected in series to the machine under test, one of said first-named machines being driven at the same frequency as the machine under test and the other machine at a frequency exceeding the former by about one to ten cycles per second.

7. An arrangement for testing two dynamo-electric machines having substantially the same power at a time, comprising two driving electric machines adapted to be run at different frequencies, connections between the terminals of one of said machines and the neutral point of the other, and connections between each group of terminals of the second machine and a corresponding machine under test.

8. A means for testing three-phase dynamo-electric machinery comprising in combination, three-phase current generating means the voltage of which is adapted to be varied, three-phase connections between said means and the machinery under test, a wattmeter, the current coil of which is inserted in one of said three-phase connections, and means for connecting the voltage coil of said wattmeter to the two remaining three-phase connections.

9. A means for testing three-phase dynamo-electric machinery comprising in combination, three-phase current generating means the voltage of which is adapted to be varied, three-phase connections between said means and the machinery under test, two wattmeters the current coils of which are inserted in two of said three-phase connections, means for connecting the voltage coils of said wattmeters between certain of said phase connections, and a switch for shifting the inter-relations of the current and voltage coils of the wattmeters.

10. A means for testing a dynamo-electric machine comprising two electric machines arranged to generate voltages of slightly different frequencies connected in series thereto.

11. A means for testing a dynamo-electric machine comprising two electric machines in series therewith, one of said last-mentioned machines being arranged to generate a voltage substantially equal to the no-load voltage of said first named machine and of its normal frequency, while the other of said last-mentioned machines is arranged to generate a lower voltage of a slightly higher frequency.

In testimony whereof I have affixed my signature.

ARLE YTTERBERG.